(12) United States Patent
Baijense et al.

(10) Patent No.: US 7,884,139 B2
(45) Date of Patent: *Feb. 8, 2011

(54) FISCHER-TROPSCH CATALYST

(75) Inventors: Cornelis Roeland Baijense, Gameren (NL); Tjalling Rekker, Culemborg (NL)

(73) Assignee: BASF Corporation, Florham Park, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/355,077

(22) Filed: Jan. 16, 2009

(65) Prior Publication Data

US 2009/0221724 A1    Sep. 3, 2009

Related U.S. Application Data

(63) Continuation of application No. 10/512,656, filed as application No. PCT/US03/12378 on Apr. 22, 2003, now Pat. No. 7,563,747.

(30) Foreign Application Priority Data

Apr. 26, 2002    (EP)    ................... 02076677

(51) Int. Cl.
    C07C 27/00    (2006.01)
    B01J 23/00    (2006.01)
    B01J 21/00    (2006.01)
    B01J 20/00    (2006.01)

(52) U.S. Cl. .................. 518/715; 502/329; 502/331; 502/343; 502/345

(58) Field of Classification Search ................ 502/329, 502/331, 343, 345; 518/715
    See application file for complete search history.

(56) References Cited

U.S. PATENT DOCUMENTS

| | | | |
|---|---|---|---|
| 4,039,302 | A | 8/1977 | Khera |
| 4,280,930 | A | 7/1981 | Antos |
| 4,333,855 | A | 6/1982 | Gardner et al. |
| 4,579,995 | A | 4/1986 | Mauldin |
| 4,780,481 | A | 10/1988 | Courty et al. |
| 4,812,434 | A | 3/1989 | Pohlmann et al. |
| 4,826,800 | A | 5/1989 | McAteer |
| 5,096,688 | A | 3/1992 | Miller et al. |
| 5,134,108 | A | 7/1992 | Thakur et al. |
| 5,227,407 | A | 7/1993 | Kim |
| 5,345,005 | A | 9/1994 | Thakur et al. |
| 5,585,316 | A | 12/1996 | Nay et al. |

(Continued)

FOREIGN PATENT DOCUMENTS

WO    0138269    5/2001

OTHER PUBLICATIONS

International Search Report for PCT/US03/12378 mailed on Jul. 17, 2003.

*Primary Examiner*—Cam N Nguyen
(74) *Attorney, Agent, or Firm*—Raymond F. Keller

(57) ABSTRACT

The present invention relates to a catalyst comprising particles of a cobalt and zinc co-precipitate, having a volume average particle size of less than 150 μm. Another aspect of the invention is the use of such a catalyst in a Fischer-Tropsch process.

The present invention further relates to a method for preparing a catalyst comprising cobalt and zinc oxide, wherein an acidic solution comprising zinc ions and cobalt ions and a alkaline solution are contacted and the precipitate is isolated.

18 Claims, 2 Drawing Sheets

Projected view of catalyst particle

U.S. PATENT DOCUMENTS

| | | |
|---|---|---|
| 5,728,918 A | 3/1998 | Nay et al. |
| 5,811,365 A | 9/1998 | Barry |
| 5,830,822 A | 11/1998 | Euzen |
| 5,945,458 A | 8/1999 | Barry |
| 6,200,680 B1 | 3/2001 | Takeda et al. |

FISCHER-TROPSCH CATALYST

The invention relates to a Fischer-Tropsch catalyst comprising cobalt and zinc, as well as to a method for preparing such a catalyst.

A catalyst containing cobalt oxide and zinc oxide for use in the synthesis of C1-C3 aliphatic hydrocarbons is known from U.S. Pat. No. 4,039,302.

U.S. Pat. No. 4,826,800 describes a process for preparing a catalyst comprising cobalt and zinc oxide for use after reductive activation as a catalyst in the conversion of synthesis gas to hydrocarbons. The catalyst is prepared by mixing a solution of a soluble zinc salt and a soluble cobalt salt with a precipitant such as ammonium hydroxide or ammonium carbonate and recovering the precipitate. The ratio of carbonate to metal is high in the described method, which has been found detrimental to the strength of the catalyst.

U.S. Pat. No. 5,345,005 relates to a Cu—Zn catalyst on alumina for the preparation of alcohols by hydrogenation of e.g. a ketone. In a comparative example, the preparation of a Cu—Zn—Co catalyst on alumina is described, wherein use is made of soda ash. However, the use of soda ash is found to be potentially detrimental to the strength of the catalyst. The particle size distribution range within which 90% of the volume of the Cu—Zn—Co catalyst described in U.S. Pat. No. 5,345,005 lies, is not specified. It is however expected that the use of soda ash in the preparation of the catalyst leads to a broadening in the particle size distribution.

U.S. Pat. Nos. 5,945,458 and 5,811,365 describe a Fischer-Tropsch process in the presence of a catalyst composition of a group VIII metal, e.g. cobalt, on a zinc oxide support. Such a catalyst is made by first preparing the support by adding a solution of zinc salt and other constituents to an alkaline bicarbonate solution. Next, the precipitate is separated from the bicarbonate solution by filtration to form a filter cake, which can thereafter be dried, calcined and loaded with the group VIII metal. The catalyst material is then formed into tablets, which tablets are crushed to form particles with a size of 250-500 µm, that can be used in a Fischer-Tropsch process. Additional post-treatments such as crushing, are required in order to obtain a catalyst powder with good strength properties. However, the obtained average particle size, as indicated above, is still relatively large. Moreover, crushing results in a broad particle size distribution and catalysts with such a large particle size and a broad particle size distribution tend to be less suitable for processes involving a bubble column, a slurry phase reactor or a loop reactor.

WO-A-01/38269 describes a three-phase system for carrying out a Fischer-Tropsch process wherein a catalyst suspension in a liquid medium is mixed with gaseous reactants in a high shear mixing zone, after which the mixture is discharged in a post mixing zone. Thus mass transfer is said to be enhanced. As suitable catalysts inter alia cobalt catalysts on an inorganic support, such as zinc oxide are mentioned. The surface area of the support used for the preparation of these known catalysts is less than 100 g/m$^2$. These prior art cobalt based catalysts can be prepared by depositing cobalt on a suitable support, such as a zinc oxide support, by impregnation methodology. Other conventional preparation methods include precipitation routes, which typically involve crushing of a hard filter cake of catalyst material, resulting from the catalyst preparation process, into small particles.

Figure 1:
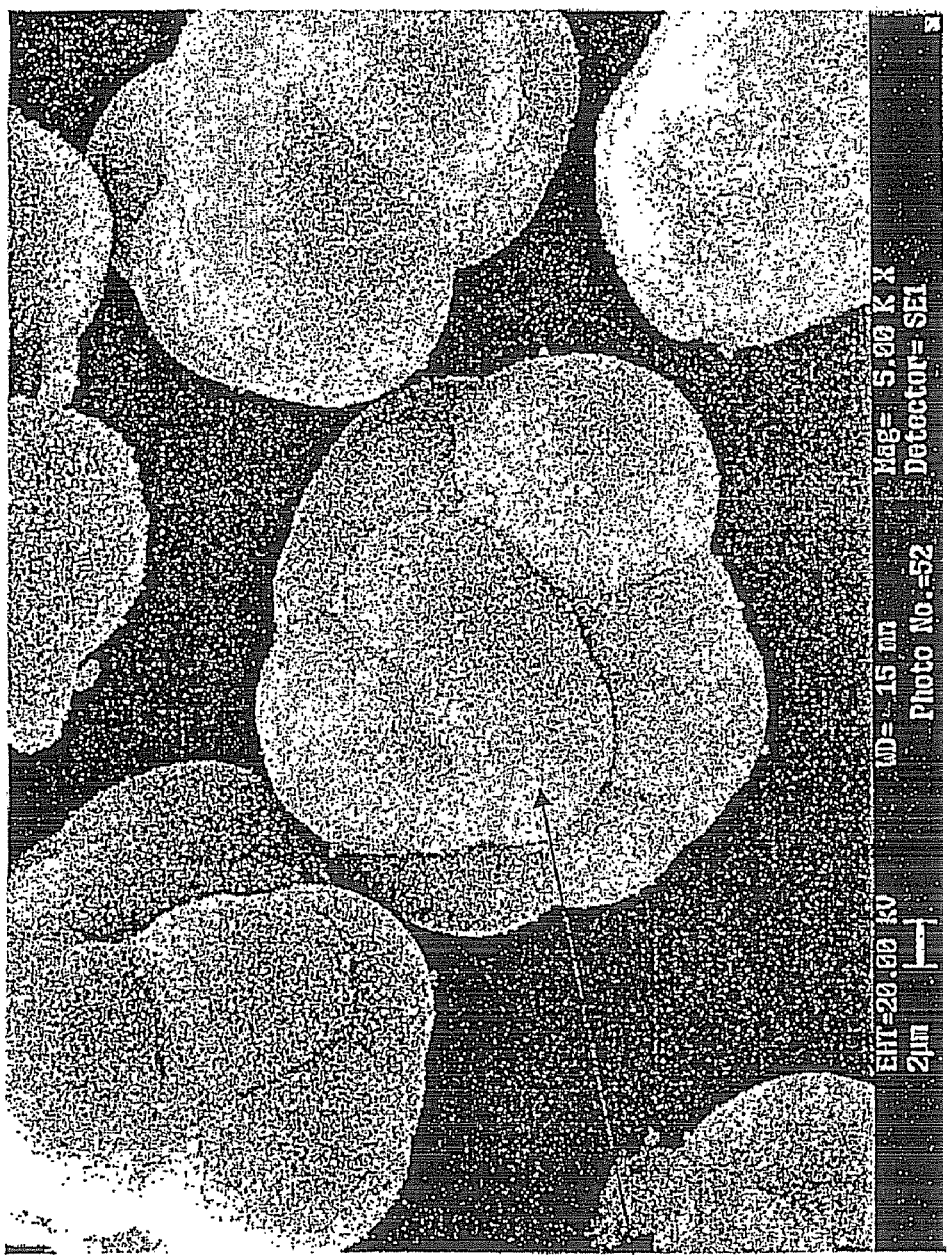
FIG. 1 shows a particle with a multi-lobed spherical geometry according to the invention.

It has however been found that these conventional catalysts do not always satisfy the requirements with respect to mass transfer and/or heat transfer, when used in a catalytic process.

Further it has been found that the dispersion behaviour of these conventional catalysts—when used in a slurry phase process—is not particularly good, since the catalyst particles tend to agglomerate.

Other problems with commercially available zinc oxide supports suitable for loading with cobalt to form a catalyst, include inappropriate particle size distribution (in particular with supports obtained by precipitation), low surface area which typically makes them more difficult to impregnate, thus several impregnation steps are required to obtain a reasonable amount of cobalt loading on the support and a low level of homogeneity of the cobalt distribution, once the cobalt has been applied.

It is an object of the present invention to provide a novel catalyst, suitable for use in Fischer-Tropsch synthesis, that may be used as an alternative to known catalysts.

It has been found that certain catalysts comprising cobalt and zinc oxide, with a particular particle size and particle size distribution have very favourable properties as Fischer-Tropsch catalysts.

Accordingly, the present invention relates to a catalyst comprising particles of a cobalt and zinc co-precipitate, having a volume average particle size of less than 150 µm and a particle size distribution wherein at least 90% of the volume of the catalyst particles have a size between 0.4 and 2.5 times the average particle size.

The volume average particle size and particle size distribution as used herein are as determined by a laser diffraction equipment, using a Malvern Master sizer MS 20 apparatus (Program contains 3 minutes, 25% (of maximum power) ultrasonic treatment before particle size distribution measurement; Calculation model: Model Independent; Presentation: 1907; see also Examples)

It has been found that a catalyst according to the present invention has very favourable properties for use in catalytic processes. A catalyst according to the invention has been found to have a particular good mass and/or heat transfer properties, when used in a catalytic process.

A catalyst according to the invention has been found to be particularly favourable for use in a stirred slurry-phase reactor, bubble-column reactor, loop reactor or fluid-bed reactor.

A catalyst according to the invention shows very good flow properties in dry form and/or when used in a stirred slurry reactor, and good dispersibility properties with the reactants in the reaction mixture. The catalyst of the invention has a very appropriate particle size distribution, as indicated by the free-flowing properties of the dried catalyst, as can be observed, for example, when the catalyst is kept in a storage flask.

A catalyst according to the invention shows very favourable separation properties and can for example very suitably be separated from the reaction mixture by filtration.

A catalyst according to the invention has an extremely good balance between activity and separation properties Catalysts according to the invention can inter alia be made by the co-precipitation of solutions containing Co- and Zn-precursors. The obtained co-precipitates (solids) can be post-treated and finally reduced to yield a Co on zinc oxide catalyst. Very suitable examples of co-precipitates include co-precipitates of Co/Zn oxide and Co/Zn carbonate, co-precipitates of Co/Zn hydroxide and Co/Zn hydroxycarbonate, and combinations thereof.

Preferably the volume average particle size of the catalyst is less than 100 μm, more preferably less than 50 μm. The lower limit is not particular critical. For practical purposes it is preferred that the size is at least such that the particles can still be separated from a liquid reaction mixture. Particularly suitable is for example a catalyst with an average particle size of 2 μm or more. Very good results have been achieved with a catalyst having a volume average particle size in the range of 5-50 μm.

With respect to the particle size distribution it is preferred that the amount of particles having a size of less than 0.4 times the average particle size is much lower (e.g. at least 5 times lower) than the amount of particles having a particle size of more than 2.5 times the average particle size. More preferably essentially none of the particles of the catalyst have a particle size of less than 0.4 times the average particle size.

Very good results have been obtained with a catalyst having a particle size distribution wherein at least 90% of the volume of the catalyst particles have a size between 0.5 and 2.2 times the average particle size, more preferably between 0.6 and 2 times the average particle size.

Preferably the pore volume of the catalyst—as determined by nitrogen adsorption ($N_2$-BET), measured on an Ankersmit Quantachrome Autosorb-6 apparatus, after degassing the sample at 180° C. to a pressure of 3.3 Pa (25 mTorr)—is at least mainly formed by pores having a diameter in the range of 5-100 nm. Much preferred wherein there are essentially no pores with a diameter of less than 5 nm (in particular less than 5% of the pore volume formed by pores with a diameter of less than 5 nm). It has been found that such a catalyst has particularly good diffusion properties for reactant and product. Such a catalyst has also been found to be highly selective towards the Fischer-Tropsch reaction.

Very good results have been achieved with a catalyst having a pore volume of less than 0.5 ml/g. The pore volume is preferably at least 0.05 ml/g. Particularly suitable is a catalyst with an pore volume of less than 0.45 ml/g.

Such a catalyst has been found to have particularly good physical strength properties, which is advantageous in applications in various types of reactors, including slurry-phase reactors, loop-reactors, bubble-column reactors and fluid-bed reactors.

Also the surface area as determined by Ankersmit Quantachrome Autosorb-6 apparatus, after degassing at 180° C. down to a pressure of 3.3 Pa (25 mTorr), can be chosen within the wide range, depending upon the intended purpose. For a Fischer-Tropsch process, this parameter may for example be chosen in the range of 1-120 $m^2/g$. Preferably a catalyst has a surface area in the range of 5-100 $m^2/g$ Very good results have been achieved with a catalyst having a surface area in the range of 5-80 $m^2/g$.

A preferred catalyst according to the invention is a particulate material wherein the particles have a more or less spherical geometry. Such a catalyst has been found to have very good strength and separation properties, and a relatively high attrition resistance during use.

Figure 2:
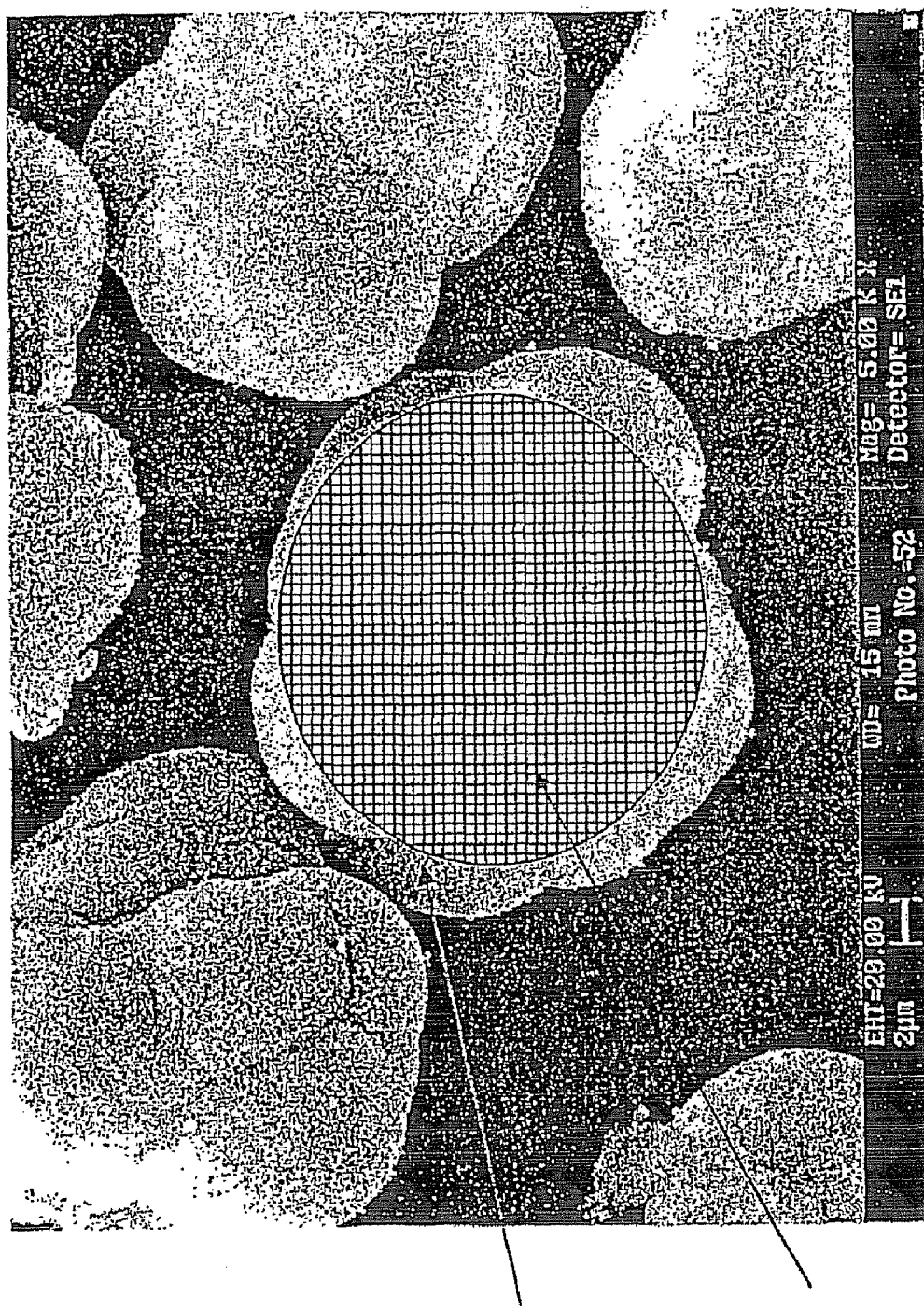
FIG. 2 shows the equivalent circle of the particle shown in FIG. 1.

Very suitable is a more or less spherically shaped catalyst wherein at least the majority of the particles have a multi-lobed spherical geometry. An example of a particle with a multi-lobed spherical geometry is shown in FIG. 1. Particular good results, e.g. with respect to heat transfer and/or mass transfer properties, have been achieved with a catalyst wherein at least the majority of the particles are multi-lobed particles having a surface area that is at least 1.05 times, preferably at least 1.1 times, more preferably at least 1.2 times the surface area of the so called equivalent circle. The term "equivalent circle" is used herein to describe the largest circumference circle that can just fit within the outline of the particle, when the particle is projected (e.g. via a micrograph) onto a plane such that the orientation in view presents the maximum possible external surface area that can be seen in any view (see also FIG. 2, for an impression of the equivalent circle of the particle shown in FIG. 1).

The composition of the catalyst can be varied widely, which composition the skilled professional will know to determine, depending upon the intended purpose.

Preferably, the zinc to cobalt atomic ratio is in the range of 40 to 0.1, more preferably in the range of 20 to 0.3.

The catalyst may essentially consist of cobalt and zinc oxide. It is however also possible that the catalyst contains one or more other components, such as components that are commonly employed in Fischer-Tropsch catalysts. For example the catalyst may contain one or more promoters, such as ruthenium, hafnium, platinum, zirconium, palladium, rhenium, cerium, lanthanum or a combination thereof. When present, such promoters are typically used in a cobalt to promoter atomic ratio of up to 10:1.

It has been found that a catalyst according to the invention comprising at least one group IIIa element, preferably in a concentration of 0.1-10 wt % based upon the total weight of the catalyst, has a very favourable structural stability. Preferred group IIIa elements include aluminium (Al), gallium (Ga) and borium (B), of which aluminium is particularly preferred.

Very good results have been obtained with a catalyst according to the invention which is essentially free of sodium. It has been found that a catalyst containing a relatively high amount of sodium is reduced in strength. Further, the presence of sodium has been found to poison the catalyst, reducing its Fischer-Tropsch activity. Therefore, a catalyst with a sodium content of less than 0.5 wt. %, more in particular of 0 to 0.15 wt. %, even more in particular of 0 to 0.1 wt. % based upon the weight of the catalyst, is preferred.

Very good results have been achieved with a catalyst according to the invention having a low content of copper or being essentially free of copper. Copper may stimulate side reactions, such as the formation of an alcohol by hydrogenation of a ketone, an aldehyde or a carboxylic acid, which are usually preferably avoided or suppressed, especially in a Fischer-Tropsch process. The copper content is preferably less than 2 wt. %, more preferably 0 to 0.5 wt % even more preferably 0 to 0.2 wt. %, based upon the weight of the catalyst.

The present invention further relates to a method for preparing a catalyst comprising cobalt and zinc oxide by co-precipitation of cobalt and zinc ions, wherein an acidic solution comprising zinc ions and cobalt ions and an alkaline solution are supplied to a reactor comprising an aqueous medium, preferably water or an aqueous solution, wherein the acidic solution and alkaline solution are contacted in the aqueous medium and a precipitate comprising cobalt and zinc is formed. The precipitate is thereafter separated from the aqueous medium (which may have formed a slurry together with the precipitate). The separated cobalt and zinc comprising precipitate is then dried and may be post-treated, e.g. calcined, etc., to form said catalyst.

The combination of acidic solution and alkaline solution is preferably chosen such that the components of the acidic solution and of the alkaline solution are soluble in the aqueous medium, but that the cobalt and zinc precipitate when they are contacted with the alkaline solution, while the counter ions of zinc and cobalt substantially remain in solution. The skilled professional will know how to choose appropriate conditions, such as the type of counter ions and the concentrations for each of the components.

This method has been found to be particularly suitable for preparing a catalyst as described above.

It has been found that a method according to the invention allows the direct preparation of a particulate precipitate that acts as a free flowing catalyst precursor, directly after drying, i.e. it allows the preparation of a precipitate that does not have to be crushed or otherwise mechanically treated to form a particulate material.

Also a method according to the invention allows the preparation of particles with a more or less spherical, optionally multi-lobed, geometry.

Preferably the precipitation of particles is carried out at a substantially constant pH, in particular at a pH value varying at most ±0.2 pH units around a set-point value. Thus it has been found possible to make a catalyst precursor with very favourable free flowing characteristics.

Preferably, the alkaline solution and the acidic solution are supplied to the reactor simultaneously (from separate conduits).

Optionally the cobalt in the isolated and dried precipitate or calcined product is reduced to metallic cobalt Suitable sources for ionic zinc respectively ionic cobalt include salts thereof that are soluble in the acidic solution and in water in a sufficient concentration. Preferred examples of such salts include zinc nitrate respectively cobalt nitrate and zinc acetate respectively cobalt acetate and other inorganic or organic salts of cobalt respectively zinc that have a similar solubility in the acidic solution Suitable components for co-precipitating with the cobalt ions and zinc ions present are inorganic salts and organic salts that are soluble in an aqueous alkaline solution in a sufficient concentration, such as hydroxides, carbonates, urea, isocyanates and any other salt that can be used as base source and that can be dissolved water of in the alkaline solution. Preferred examples of such salts include ammonium carbonate, ammonium bicarbonate and other inorganic or organic salts of carbonate that have at least a similar solubility in the alkaline solution.

Preferably, the total concentration of zinc and cobalt ions in the aqueous medium is chosen in the range of 0.1 to 5 moles/liter. The concentration is preferably kept within this range throughout the precipitation step.

The pH of the acid solution is preferably in the range of 1-5. The pH of the alkaline solution is preferably in the range of 6-14. The pH in the aqueous medium (wherein the co-precipitation takes place) is preferably in the range of 4-9, depending upon the type of precursor salts used as a source for cobalt, zinc and alkaline component(s).

The stirring frequency is very suitably chosen to obtain a power input in the range of 1-300 kW/l aqueous medium. Very good results have been achieved with a power input in the range of 10-100 kW/l aqueous medium.

The temperature during the co-precipitation process is preferably chosen in the range of 5-98° C., more preferably in the range of 15-75° C.

The present invention further relates to the use of a catalyst according to the invention in a slurry reactor, a loop reactor, a bubble-column reactor or a fluid-bed reactor. The present invention further relates to the use of a catalyst according to the invention in a Fischer-Tropsch process or a functional group hydrogenation process, such as nitrile hydrogenation to amines.

The invention is further illustrated by the following examples.

EXAMPLE 1

Catalyst Preparation

A metal solution (1000 ml) containing 10.0 g/l cobalt and 72.3 g/l zinc was prepared by dissolving 329 g of $Zn(NO_3)_2 \cdot 9H_2O$ and 49.4 g of $Co(NO_3)_2 \cdot 6H_2O$ in 1000 ml of demineralised water. The base solution was prepared by dissolving 154 g of $(NH_4)_2CO_3$ in 1000 ml of demineralised water. The metal and base solution were injected simultaneously at equal flow rates (1000 ml/hr) into a well stirred, baffled precipitation vessel containing 1750 ml of demineralised water. The temperature during precipitation was maintained at 60° C. The input power (N) was 0.5 Watt per liter; calculated using the formula $$N = \frac{k x \rho x n^3 x d^5}{V}$$

With: N=input power of turbine impeller (Watt)
k=factor 6 for a turbine impeller
$\rho$=stirred liquid density (kg/m$^3$)
n=agitation rotational speed (s$^{-1}$)
d=agitator diameter (m)
V=volume of precipitation vessel (3.5 liters)

The pH was kept constant at pH 5.8 by providing acid solution and alkaline solution at equal addition rates.

The resulting precipitate was washed with demineralised water and dried overnight at 110° C. The dried catalyst was heated from room temperature with 150° C./hr to 500° C. and calcined for 5 hours at 500° C. The properties of the calcined catalyst are summarised in Table 1.

EXAMPLE 2

Comparison (e.g. as Described in U.S. Pat. No. 4,826,800)

A metal solution containing 20.0 g/l Co and 64.3 g/l Zn was prepared by dissolving 292 g $Zn(NO_3)_2 \cdot 6H_2O$ and 98.7 g $Co(NO_3)_2 \cdot 6H_2O$ in 2.6 l demineralised water to form an acid solution. In the precipitation vessel, a base solution was prepared by dissolving 675 g $(NH_4)_2CO_3$ in 5.2 liter of demineralised water. The acid solution was injected with 12 ml/min into the precipitation vessel, containing the base solution, while stirring at room temperature (300 RPM). During the addition, the pH dropped from 9.2 (initial) to 8.4 (final).

The resulting precipitate was washed with demineralised water and dried overnight at 110° C. Some mechanical treatment was required to get a powder out of the dried filtercake. This powder showed no free flowing behaviour. The dried catalyst powder was calcined at 500° C. for 5 hours (ramp rate 150° C./h).

EXAMPLE 3

Catalyst Characterisation Data and Comparison with Conventional Catalyst

Table 1 describes the properties of the catalyst according to the invention and a comparison with a corresponding conventional catalyst

TABLE 1

|  |  | Catalyst according to Example 1 | Comparison catalyst (Example 2) |
|---|---|---|---|
| Cobalt content | wt % | 7.1 | 26.3 |
| BET-surface area | m²/g | 16 | 41 |
| N₂ pore volume | ml/g | 0.20 | 0.55 |
| Particle size distribution |  |  |  |
| D(v. 0.9)[1] | μm | 34.3 | 96.2 |
| D(v. 0.5)[1] | μm | 25.3 | 5.7 |
| D(v. 0.1)[1] | μm | 19.7 | 1.5 |
| Span[1] |  | 0.6 (very narrow) | 16.5 (very broad) |
| Crystallite size[2] | Å | 154 | 143 | ad 1: The span is calculated from the measured Malvern particle size distribution and gives an indication for the broadness of the particle size distribution, as is defined as follows:

$$\text{Span} = \frac{D[v, 0.9] - D[v, 0.1]}{D[v, 0.5]}$$

wherein:

D[v,0.9]=particle size (μm) below which 90% of particles exists (in Malvern volume particle size distribution).

D[v,0.5]=particle size (μm) below which 50% of particles exists (in Malvern volume particle size distribution).

D[v,0.1]=particle size (μm) below which 10% of particles exists (in Malvern volume particle size distribution).

ad 2: The $Co_3O_4$ crystallite size, as reported in table 1, is calculated from the XRD spectrum, particularly from the d=2.03 line in the XRD pattern (CuK☐-radiation).

The cobalt content herein was measured by X-ray fluorescence.

EXAMPLE 4

Measurement of the Particle Size Distribution

The particle size distribution of a catalyst according to the invention was measured on a Malvern Mastersizer MS 20.

The sample vessel of the apparatus was filled with demineralized water, and diffraction of measuring-cell filled with water was determined (for background correction). An appropriate amount of catalyst powder was then added to the sample vessel, which was treated in ultrasonic bath for 3 minutes (25% of max. output u.s. power) and stirring (50% of max. stirring speed), prior to the measurement. After this treatment, the sample was measured and the measured diffraction signal was corrected for the 'background' measurement.

Calculation of particle size distribution was done, using the following parameters: Model: Model Independent; Presentation: 1907; Particle size distribution: Volume distribution).

EXAMPLE 5

Catalytic Performance of Catalyst in Fischer-Tropsch Reaction

A catalyst with a cobalt content of 20 wt. % was prepared. Apart from the different cobalt content, the preparation conditions were the same as in Example 1.

A sample of catalyst (20 g) was reduced in a 3.5 cm OD tubular reactor. The reactor was purged with nitrogen at a space velocity (GHSV) of 1000 h-1 at atmospheric pressure. The temperature was raised at 2° C./min to 60° C. The gas feed was then switched over to air at 1000 GHSV. The temperature was then raised at 1° C./min up to 250° C. and held there for 3 hours. The gas flow was then changed to nitrogen at 1000 GHSV for 6 minutes and then the feed gas was switched to carbon monoxide at 1000 GHSV and held for 3.5 hours.

The feed gas was then changed back to nitrogen and the temperature ramped at 4° C./min up to 280° C. Once at 280° C., the feed gas was then switched to hydrogen at 2500 GHSV and held there for 10 hours. The reactor was then cooled to room temperature and purged with nitrogen prior to transfer to the reactor.

The catalyst was transferred under nitrogen purge to a 600 ml continuous stirred tank reactor (CSTR) that had been filled with squalane (300 ml; Aldrich). The reactor was sealed and heated up to 125° C. with a nitrogen flow of 250 ml/min. The feed gas to the reactor was then switched to syngas at 8000 GHSV, the stirrer speed increased to 700 rpm and the temperature ramped at 2° C./min up to 130° C. The reactor was then pressurised to 20 barg at 30 bar/hr. The temperature was then ramped at 60° C./hour up to 160° C., 5° C./hour up to 175, 1° C./hour up to 185, 0.5° C./hour up to 205° C. and 0.3° C./hour up to 212° C. Automatic temperature control was then used to maintain the % CO Conversion at 60%.

After 40 hours on stream a C5+ productivity of 608 g/liter of catalyst/hr was obtained at a temperature of 226° C.

What is claimed is:

1. Catalyst particles consisting essentially of:
   a cobalt and zinc-precipitate;
   optionally, one or more promoters selected from a group consisting of ruthenium, hafnium, platinum, zirconium, palladium, rhenium, cerium, lanthanum, and combinations thereof; and
   optionally, at least one group IIIa element;
   said catalyst particles having a volume average particle size of less than 150 μm and a particle size distribution wherein at least 90% of the volume of the catalyst particles have a size between 0.4 and 2.5 times the average particle size.

2. Catalyst particles according to claim 1, wherein the volume average particle size is less than 100 μm.

3. Catalyst particles according to claim 1, wherein the pore volume is mainly formed by pores having a diameter within the range of 5-100 nm.

4. Catalyst particles according to claim 1, wherein the pore volume is less than 0.5 ml/g.

5. Catalyst particles according to claim 1, wherein the surface area is less than 120 m²/g.

6. Catalyst particles according to claim 1, wherein the zinc to cobalt atomic ratio is in the range of 40 to 0.1.

7. Catalyst particles according to claim 1, consisting essentially of particles with a multi-lobed spherical geometry.

8. Catalyst particles according to claim 7, wherein the multi-lobed particles have a surface area that is at least 1.05 times the surface area of the an equivalent circle, wherein the equivalent circle is defined as the largest circumference circle that can just fit within the outline of the particle, when the particle is projected onto a plane such that the orientation in view presents the maximum possible external surface area that can be seen in any view.

9. Catalyst particles according to claim 1, wherein the catalyst particles are essentially free of copper.

10. Catalyst particles according to claim 1, wherein the catalyst particles are essentially free of sodium.

11. Catalyst particles according to claim 1, consisting essentially of particles with an approximately spherical geometry.

12. Catalyst particles according to claim 1, wherein the volume average particle size is 2 to 50 μm.

13. Catalyst particles according to claim 1, wherein the pore volume is less than 0.45 ml/g.

14. Method for preparing a catalyst according to claim 1, comprising:
  supplying in a reactor comprising an aqueous medium an acidic solution comprising zinc ions and cobalt ions and an alkaline solution, thereby producing a precipitate comprising cobalt and zinc;
  isolating the precipitate from the aqueous medium; and
  drying and post treating the precipitate to form said catalyst particles.

15. Method according to claim 14, wherein the acidic solution comprises one or more anions selected from the group consisting of nitrate and acetate.

16. Method according to claim 14, wherein the alkaline solution comprises ammonium.

17. A Fischer-Tropsch process, comprising:
  supplying in a reactor a synthesis gas and a mixture comprising carbon monoxide and hydrogen;
  adding the catalyst particles according to claim 1 to the reactor; and
  producing at least one liquid hydrocarbon.

18. The Fischer-Tropsch process according to claim 17, the reactor is a slurry reactor, a loop reactor, a bubble column or a fluid bed reactor.

* * * * *